(12) United States Patent
Tsuchida

(10) Patent No.: US 8,293,389 B2
(45) Date of Patent: Oct. 23, 2012

(54) ALL-SOLID STATE LITHIUM SECONDARY BATTERY

(75) Inventor: Yasushi Tsuchida, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/307,702

(22) Filed: Nov. 30, 2011

(65) Prior Publication Data

US 2012/0077078 A1 Mar. 29, 2012

Related U.S. Application Data

(63) Continuation of application No. 12/521,654, filed as application No. PCT/JP2008/051055 on Jan. 25, 2008.

(30) Foreign Application Priority Data

Feb. 13, 2007 (JP) ................................. 2007-032561

(51) Int. Cl.
*H01M 10/52* (2006.01)
*H01M 10/0562* (2010.01)
*H01M 2/12* (2006.01)

(52) U.S. Cl. ........... 429/57; 429/163; 429/248; 429/304
(58) Field of Classification Search .......... 429/121–347, 429/118, 119
See application file for complete search history.

(56) References Cited

U.S. PATENT DOCUMENTS

| | | | |
|---|---|---|---|
| 6,551,744 B1 * | 4/2003 | Ohzuku et al. | ................. 429/223 |
| 2003/0129487 A1 * | 7/2003 | Inoue et al. | .................... 429/176 |
| 2006/0073388 A1 | 4/2006 | Harada et al. | |

FOREIGN PATENT DOCUMENTS

| | | |
|---|---|---|
| JP | 11-219722 | 8/1999 |
| JP | 2001-52733 | 2/2001 |
| JP | 2001-155790 | 6/2001 |
| JP | 2003-151558 | 5/2003 |
| JP | 2004-87152 | 3/2004 |
| JP | 2004-227818 | 8/2004 |
| WO | WO 2007/004590 A1 | 1/2007 |

* cited by examiner

*Primary Examiner* — Basia Ridley
*Assistant Examiner* — James Lee
(74) *Attorney, Agent, or Firm* — Finnegan, Henderson, Farabow, Garrett & Dunner, LLP

(57) ABSTRACT

A main object of the present invention is to provide a safe and highly-reliable all-solid-state lithium secondary battery using a sulfide-based solid electrolyte material which can restrain generation of hydrogen sulfide gas, in case a large amount of water is entered into a battery case by an accident such as submersion associated with a breakage of the container.

To attain the above-mentioned object, the present invention provides an all-solid-state lithium secondary battery using a sulfide-based solid electrolyte material, characterized in that the battery has a metal salt M-X comprising a metal element "M" and an anionic part "X" in a battery case thereof, and further characterized in that a metal cation of the metal salt M-X generated by disassociation caused with water can react with a sulfide ion generated by a reaction between the sulfide-based solid electrolyte material and the water.

1 Claim, 1 Drawing Sheet

ALL-SOLID STATE LITHIUM SECONDARY BATTERY

This is a continuation of U.S. application Ser. No. 12/521,654, filed Nov. 1, 2010, which is a national stage of PCT/JP2008/051055, filed Jan. 25, 2008, which claims priority to Japanese Application No. 2007-032561, filed Feb. 13, 2007. The contents of each of these applications are incorporated herein by reference.

TECHNICAL FIELD

The present invention relates to a safe and highly-reliable all-solid-state lithium secondary battery using a sulfide-based solid electrolyte material which can restrain generation of hydrogen sulfide gas.

BACKGROUND ART

With the recent rapid spread of information-related devices and communication devices such as personal computers, video cameras and cellular phones, developments of good secondary batteries, such as lithium secondary batteries, as electric power supply for those devices have been gaining recognition. Further, apart from the technical fields of information-related devices and communication devices, developments of high output and high capacity lithium secondary batteries for electric vehicles and hybrid-power cars as low-emission vehicles have been progressed in other fields such as an automobile industry.

However, since current lithium secondary batteries commercially-supplied use organic electrolyte solutions which have combustible organic media as solvents, attaching of safety systems to prevent temperature rising against short circuit and improvements in their technical structures and materials to prevent short circuit are required.

In contrast, since all-solid-state lithium secondary batteries having their batteries made to an all-solid-state by changing liquid electrolytes to solid electrolytes do not use combustible organic solvents therein, their safety systems are simplified. Accordingly, it is thought that such batteries are good in reducing production costs and in enhancing productivity.

The above-mentioned all-solid-state lithium secondary batteries are produced, for example, by: forming a pellet of three-layer structure of cathode/solid electrolyte/anode by a powder-molding method, inserting the respective battery into a conventional coin-type battery case or a button type battery case, and sealing the periphery thereof. Such all-solid-state lithium secondary batteries tend to have a larger electrochemical resistance and a smaller output current compare to lithium secondary batteries using organic electrolyte solution, because their members constituting the batteries, which are cathode, anode and electrolyte, are all hard solid.

In light of this, it is preferable to use a material having a high ion conductivity as an electrolyte in order to enhance an output current of an all-solid-state lithium secondary battery. Sulfide glasses such as $Li_2S$—$SiS_2$, $Li_2S$—$B_2S_3$, $Li_2S$—$P_2S_5$ show a high ion conductivity over $10^{-4}$ S/cm. Further, a material in which a substance such as $LiI$, $Li_3PO_4$ added thereto also show a high ion conductivity of about $10^{-3}$ S/cm. It is thought that these glasses having sulfide as their main constituent show higher ion conductivities compare to those of oxide glasses because sulfide ions are ions having larger polarization compare to oxide ions and sulfide ions have small electrostatic attractive force with lithium ions.

However, with batteries using solid electrolyte materials (sulfide-based solid electrolyte materials) which have the above-mentioned sulfide as their main constituent, there is a risk of leaking hydrogen sulfide gas to the outside of their battery cases when water is entered into the battery cases and the gas is generated. As hydrogen sulfide gas has pungent odor, prevention of the gas leakage to the outside of the battery case is desired.

To respond such desire, a method of providing an adsorbent to inside or outside of a battery case to absorb the gas generated inside the battery is proposed. For example, in the Patent Document 1, hydrogen sulfide gas is absorbed by using adsorbents such as zeolite, silica gel and activated carbon. However, since the adsorbent such as zeolite, silica gel and activated carbon absorb the gas using the surface adsorption, their adsorptive capacity are lost when the surface is covered by a large amount of water or the like. Therefore, there has been a problem of being incapable in preventing the leakage of hydrogen sulfide gas generated because their adsorptive capacity is lowered when a large amount of water is entered into a battery by an accident such as submersion caused by breakage of the container or being exposed to buckets of rain.

Patent Document 1: Japanese Patent Application Laid-Open (JP-A) No. 2004-087152
Patent Document 2: JP-A No. 2004-227818
Patent Document 3: JP-A No. 2003-151558
Patent Document 4: JP-A No. 2001-052733
Patent Document 5: JP-A No. 11-219722
Patent Document 6: JP-A No. 2001-155790

DISCLOSURE OF INVENTION

Problem to be Solved by the Invention

The present invention was achieved in view of the above-mentioned problems. A main object of the present invention is to provide a safe and highly-reliable all-solid-state lithium secondary battery using a sulfide-based solid electrolyte material which can restrain generation of hydrogen sulfide gas, in case a large amount of water is entered into a battery case by an accident such as submersion associated with a breakage of the container.

Means for Solving the Problems

To attain the above-mentioned object, the present invention provides an all-solid-state lithium secondary battery using a sulfide-based solid electrolyte material, characterized in that the battery has a metal salt M-X comprising a metal element "M" and an anionic part "X" in a battery case thereof, and further characterized in that a metal cation of the metal salt M-X generated by disassociation caused with water can react with a sulfide ion generated by a reaction between the sulfide-based solid electrolyte material and the water.

According to the present invention, the metal cation of the metal salt M-X generated by disassociation caused with water can react with the sulfide ion generated by a reaction between the sulfide-based solid electrolyte material and the water. Accordingly, the present invention can provide a safe and highly-reliable all-solid-state lithium secondary battery using a sulfide-based solid electrolyte material which can restrain generation of hydrogen sulfide gas, in case a large amount of water is entered into a battery case by an accident such as submersion associated with a breakage of the container.

In the above-mentioned invention, it is preferable that the metal element "M" of the metal salt M-X is at least one selected from the group consisting of Cd, Sn, Pb, Cu, Hg, Ag, Al, Mn, Zn, Fe and Ni, and that the anionic part, "X" of the metal salt M-X is at least one selected from the group consisting of OH, SO₄ and NO₃. This is because, such "M" and "X" as mentioned above allow a reaction between: the metal cation generated by dissociation of the metal salt M-X in water, and the sulfide ion generated by a reaction between the sulfide-based solid electrolyte material and the water, and the resultant can precipitate as a stable solid substance less likely to be dissolved in water. Further, by being precipitated as the solid substance mentioned above, the resultant does not disperse in the atmosphere and possible dangers such as a person inhaling the resultant can be strongly restrained. Therefore, a safer and more highly-reliable all-solid-state lithium secondary battery using a sulfide-based solid electrolyte material can be obtained.

Effect of the Invention

The present invention attains an effect of providing a safe and highly-reliable all-solid-state lithium secondary battery using a sulfide-based solid electrolyte material which can restrain generation of hydrogen sulfide gas, in case a large amount of water is entered into a battery case by an accident such as submersion associated with a breakage of the container.

| Description of the Reference Number | |
|---|---|
| 1 | All-solid-state lithium secondary battery |
| 2 | Solid electrolyte layer |
| 3 | Cathode layer |
| 4 | Anode layer |
| 5 | Spacer |
| 6 | Battery case |
| 7 | Resin packing |
| 8 | Metal salt |
| 9 | Current collector |

BEST MODE FOR CARRYING OUT THE INVENTION

Hereinafter, an all-solid-state lithium secondary battery of the present invention will be explained in detail.

The all-solid-state lithium secondary battery of the present invention uses a sulfide-based solid electrolyte material and is characterized in that the battery has a metal salt M-X comprising a metal element "M" and an anionic part "X" in a battery case thereof, and further characterized in that a metal cation of the metal salt M-X generated by disassociation caused with water can react with a sulfide ion generated by a reaction between the sulfide-based solid electrolyte material and the water.

According to the present invention, the metal cation of the metal salt M-X generated by disassociation caused with water can react with the sulfide ion generated by a reaction between the sulfide-based solid electrolyte material and the water. The sulfide-based solid electrolyte material generates hydrogen sulfide ($H_2S$) gas when it is contacted to water. The hydrogen sulfide ($H_2S$) gas firstly dissolves into the water and dissociates to $H^+$ and $S^{2-}$ in the water. The amount that $H^+$ and $S^{2-}$ respectively dissolves into water has a saturated amount, and when the dissolved amount reaches to the saturated amount, hydrogen sulfide ($H_2S$) gas is generated into the atmosphere.

In the present invention, the metal salt M-X is presented in a battery case. When a large amount of water is entered into the battery case, the metal salt M-X reacts with the water and dissociates therefrom to generate a metal cation. The metal cation reacts with the sulfide ion ($S^{2-}$). As a result, an M-S (metal sulfide) is generated and become a precipitate to fix the sulfide ion ($S^{2-}$). Therefore, it is possible to restrain the sulfide ion ($S^{2-}$) in the water from reaching to the saturated amount and to further restrain the generation of the hydrogen sulfide ($H_2S$) gas into the atmosphere. Accordingly, the present invention can provide a safe and highly-reliable all-solid-state lithium secondary battery using a sulfide-based solid electrolyte material which can restrain generation of hydrogen sulfide gas, in case a large amount of water is entered into a battery case by an accident such as submersion associated with a breakage of the container.

Hereinafter, the all-solid-state lithium secondary battery of the present invention will be explained with a reference to the drawings.

Figure 1A:
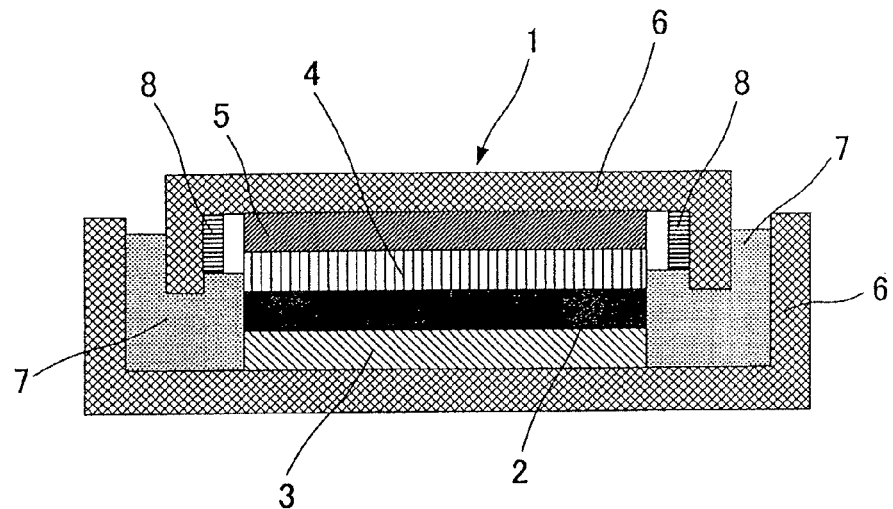
FIGS. 1A and 1B are a schematic sectional view showing one example of the structure of an all-solid-state lithium secondary battery of the present invention.
Figure 1B:
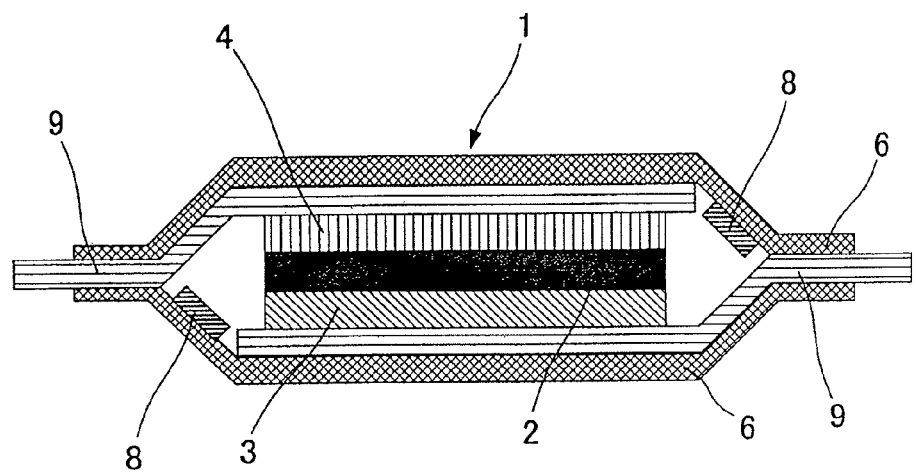

FIG. 1A is a view showing one embodiment of a technical structure of a coin type all-solid-state lithium secondary battery of the present invention. As shown in FIG. 1A, when the battery of the present invention is a coin type, it has a technical structure wherein an all-solid-state lithium secondary battery 1 comprises a solid electrolyte layer 2 sandwiched between a cathode layer 3 and an anode layer 4, a spacer 5 is further provided on the outside of the anode layer, and those mentioned are covered by a battery case 6 as a whole and sealed by a resin packing 7. A metal salt 8 is provided in a place inside the battery case 6 where no potential is applied. FIG. 1B is a view showing one embodiment of a technical structure of a laminate type all-solid-state lithium secondary battery of the present invention. As shown in FIG. 1B, when the battery of the present invention is a laminate type, it has a technical structure wherein an all-solid-state lithium secondary battery 1 comprises a solid electrolyte layer 2 sandwiched between a cathode layer 3 and an anode layer 4, a current collector 9 is further provided on the outside thereof, and those mentioned are covered by a battery case 6 as a whole and sealed. Similar to the coin type battery, a metal salt 8 is provided in a place inside the battery case 6 where no potential is applied.

Hereinafter, the all-solid-state lithium secondary battery will be explained by each structure.

1. Metal Salt

The metal salt used in the present invention comprises a metal element "M" and an anionic part "X", wherein a metal cation of the metal salt M-X generated by dissociation caused with water can react with a sulfide ion generated by a reaction between water and a sulfide-based solid electrolyte material to be explained later. The sulfide-based solid electrolyte material is specifically a sulfide-based solid electrolyte material Li-A-S comprising Li, A (A is at least one selected from the group consisting of P, Ge, B, Si and I), and S. Accordingly, generation of hydrogen sulfide gas can be restrained, in case a large amount of water is entered into the battery case by an accident such as submersion associated with a breakage of the container. This is because of the following reasons. Generally, when the sulfide-based solid electrolyte material is in contact with water, a reaction shown in the below formula (1) is caused and hydrogen sulfide ($H_2S$) gas is generated:

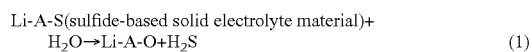

$$\text{Li-A-S(sulfide-based solid electrolyte material)} + H_2O \rightarrow \text{Li-A-O} + H_2S \qquad (1)$$

(in the formula, A is at least one selected from the group consisting of P, Ge, B, Si and I).

In the above-mentioned formula (1), the hydrogen sulfide ($H_2S$) gas firstly dissolves into water and dissociates to $H^+$ and $S^{2-}$ in the water. The amount that $H^+$ and $S^{2-}$ respectively dissolves into water has a saturated amount, and when the dissolved amount reaches to the saturated amount, hydrogen sulfide ($H_2S$) gas is generated into the atmosphere.

In the present invention, the metal salt M-X is presented in a battery case, and a metal cation is generated by disassociation caused by a reaction between the metal salt M-X and water in case a large amount of water is entered into the battery case. As the metal cation reacts with the sulfide ion ($S^{2-}$), an M-S (metal sulfide) is generated, become a precipitate and fixes the sulfide ion ($S^{2-}$) as shown in the below formula (2):

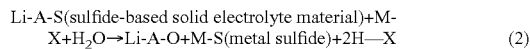

Li-A-S(sulfide-based solid electrolyte material)+M-X+$H_2O$→Li-A-O+M-S(metal sulfide)+2H—X  (2)

(in the formula, A is at least one selected from the group consisting of P, Ge, B, Si and I). Therefore, the sulfide ion ($S^{2-}$) in the water is restrained from reaching to its saturated amount and further, generation of hydrogen sulfide ($H_2S$) gas into the atmosphere can be restrained.

In the present invention, the metal salt M-X is not particularly restricted as long as the metal salt reacts with water to generate a metal cation and the metal cation can react with the sulfide ion ($S^{2-}$). It is preferable that the generated substance thereby obtained is a stable solid substance less soluble in water and precipitates therein. By being precipitated as the solid substance mentioned above, the resultant does not disperse in the atmosphere and possible dangers such as a person inhaling the resultant can be strongly restrained. Therefore, a safer and more highly-reliable all-solid-state lithium secondary battery using a sulfide-based solid electrolyte material can be obtained. Such metal element "M" of the metal salt M-X is preferably at least one selected from the group consisting of Cd, Sn, Pb, Cu, Hg, Ag, Al, Mn, Zn, Fe and Ni. Among them, Cd, Sn, Pb, Cu, Hg and Ag are more preferable and Ag, Cu and Sn are especially preferable because they have fast generating rate in generating the precipitate and being low in their environmental burden.

Further, as the anionic part "X" of the metal salt M-X, it is preferable that the part is at least one selected from the group consisting of $OH^-$, $SO_4^{2-}$ and $No_3^-$. Among them, $SO_4^{2-}$ and $No_3^-$ is more preferable, and $No_3$ is especially preferable since they have a high dissociation degree.

When the metal element "M" is Al, the anionic part "X" is preferably $OH^-$.

The state of the metal salt used in the present invention is not particularly limited as long as the metal salt has the above-mentioned functions as a metal salt. It is preferable that the metal state is in a state which reacts with water when the water enters into the battery case. For example, a metal salt in solid state can be cited. As the example of the solid state, a powder state, a pellet state obtained by molding and solidifying the powder or by other means, and a film state can be cited. Among them, a film state is preferable because it dissolves well into the entered water. As an example of a producing method of a metal salt in such a film state, a method of dropping an aqueous solution of metal salt to a predetermined position and drying it can be cited.

A position to provide the metal salt is preferably a position which does not contact to a part where potential of a terminal and an electrode such as a cathode or an anode is applied. This is to prevent the metal salt from changing caused with a reaction such as reduction by the potential to the metal salt.

Further, a position close to a sulfide-based solid electrolyte layer which has a risk of generating much hydrogen sulfide gas when water is entered into the battery case, a position close to the sealed part sealing the battery where the water is likely to enter, and the like are preferable.

Still further, it is preferable to provide the metal salt over parts as wide as possible within the battery case. This is to respond to a damage caused to every part of the battery case. Thereby, the metal salt can be dissociated no matter where of the battery case the water is entered, the metal cation generated by the dissociation can react with a sulfide ion to precipitate the metal sulfide and the sulfide ion can be fixed. As a result, generation of the hydrogen sulfide gas can be restricted more safely.

The amount of the metal salt provided in the battery case is not particularly restricted as long as the above-mentioned functions as the metal salt can be retained. The amount varies depending on factors such as the amount of the sulfide ion ($S^{2-}$) generated when the sulfide-based solid electrolyte material reacts with water, or the state of the metal salt. Generally, the metal salt is preferably provided in large excess to the sulfur (S) contained in the sulfide-based solid electrolyte layer. Specifically, when the anionic part "X" of the metal salt is a divalent anion in mol ratio to 1 mol, for example, it is preferable to be within the range of: sulfur (S):metal salt=1:1 to 100, more preferable to be within the range of: sulfur (S):metal salt=1:1 to 10, and particularly preferable to be within the range of: sulfur (S):metal salt=1:1 to 5. When the anionic part "X" of the metal salt is a monovalent anion, the amount needs to be double of the case when the anionic part "X" of the metal salt is divalent.

When the mol ration between the sulfur (S) and the metal salt remains the above-mentioned ranges, it is sufficient for the metal cation generated by dissociation of the metal salt caused with water to fix, as the metal sulfide, the sulfide ion ($S^{2-}$) generated when the sulfide-based solid electrolyte material reacts with water and dissolves therein. Accordingly, sulfur (S) can be fixed better and generation of the hydrogen sulfide gas can be restrained more safely.

2. Sulfide-based Solid Electrolyte Layer

A sulfide-based solid electrolyte layer used in the present invention will be explained. The sulfide-based solid electrolyte layer used in the present invention uses a sulfide-based solid electrolyte material. Specifically, a sulfide-based solid electrolyte material uniaxially-compressed and molded into a pellet form can be cited as an example.

In the present invention, as the sulfide-based solid electrolyte material used for the sulfide-based solid electrolyte layer, a solid electrolyte material (Li-A-S) made of Li, A, and S can be cited. The "A" of the sulfide-based solid electrolyte material Li-A-S is at least one selected from the group consisting of P, Ge, B, Si and I. As the specific examples of such sulfide-based solid electrolyte material Li-A-S, $70Li_2S-30P_2S_5$, $LiGe_{0.25}P_{0.75}S_4$, $80Li_2S-20P_2S_5$, and $Li_2S$—$SiS_2$ can be cited. Among them, $70Li_2S-30P_2S_5$ is particularly preferable because it has a high ion conductivity.

As a method to produce a sulfide-based solid electrolyte material used in the present invention, it is not particularly restricted as long as a desired sulfide-based solid electrolyte material can be obtained. For example, a method of vitrifying a material such as a material containing Li and S by a planetary ball mill and heat treating the same can be cited.

3. Cathode Layer

A cathode layer used in the present invention will be explained. The cathode layer used in the present invention is not particularly limited as long as the layer has a function as a cathode layer. Materials used for general all-solid-state lithium secondary batteries can be applied as cathode materials used for the cathode layer. For example, a material wherein a cathode active material $LiCoO_2$ and a solid electrolyte $LiGe_{0.25}P_{0.75}S_4$ are mixed and made to a cathode mix can be cited. Further, a conductivity auxiliary agent such as an acetylene black, a Ketjen Black and carbon fiber may be contained in the cathode layer in order to improve conductivity.

A layer thickness of the cathode layer used in the present invention is not particularly restricted. A cathode layer having a thickness same to a thickness of a solid electrolyte film used for a general all-solid-state lithium secondary battery may be used.

4. Anode layer

An anode layer used in the present invention will be explained. The anode layer used in the present invention is not particularly limited as long as the layer has a function as an anode layer. Materials used for general all-solid-state lithium secondary batteries can be applied as an anode layer material used for the anode layer. For example, an indium foil can be cited. Further, a conductivity auxiliary agent such as an acetylene black, a Ketjen Black and carbon fiber may be contained in the anode layer in order to improve conductivity.

A layer thickness of the anode layer used in the present invention is not particularly restricted. An anode layer having a thickness same to a thickness of a solid electrolyte film used for a general all-solid-state lithium secondary battery may be used.

5. Other Structure

In the all-solid-state lithium secondary battery of the present invention, constituents other than the above-mentioned metal salt, sulfide-based solid electrolyte layer, cathode layer, anode layer, i.e., such as a spacer, a resin packing, a battery case, and a current collector, are not particularly restricted and those used in general all-solid-state lithium secondary batteries can be used. Specifically, as a spacer, a material same as the battery case is preferable and a spacer made of materials such as stainless and aluminum can be cited as examples. As a resin packing, a resin having a low water absorption rate is preferable and an epoxy resin can be cited as an example. Further, as a battery case, a metal made is generally used and a battery case made of stainless can be cited as an example. Moreover, a current collector has a function to transmit an electron caused by a reaction. As the current collector, it is not particularly restricted as long as it has conductivity. For example, a metal foil of Al, Ni, Ti, or a carbon paper can be cited as an example. Further, the current collector used in the present invention may be the one combining the function of the battery case. Specifically, a case of preparing a battery case made of a SUS (stainless steel) and using a part thereof as a current collector can be cited as an example.

In the present invention, as an adsorbent, a material such as zeolite, silica gel and activated carbon maybe provided inside or outside of the battery case. Thereby, when hydrogen sulfide ($H_2S$) gas is generated by a small amount of water, small to the extent that dissociation of the metal salt of the present invention would not be caused, such as in a case when the battery is placed under a highly-humid environment and moisture presented in the atmosphere enters into the battery case, the generated hydrogen sulfide ($H_2S$) gas can be adsorbed. Therefore, a safer and more highly-reliable all-solid-state lithium secondary battery using a sulfide-based solid electrolyte material can be obtained.

6. Method for Producing an All-Solid-State Lithium Secondary Battery

A method for producing an all-solid-state lithium secondary battery of the present invention is not particularly restricted as long as the above-mentioned all-solid-state lithium secondary battery can be obtained. For example, the following method of producing a battery cell can be cited: the cathode material, the sulfide-based solid electrolyte material, and the anode material are placed in a molding holder and uniaxial compressed and molded into a pellet form to obtain an all-solid-state lithium secondary battery pellet in pellet state; and next, after an aqueous solution of a metal salt is provided to the predetermined position in the battery case, the all-solid-state lithium secondary battery pellet is provided in the battery case.

7. Application

The application of the all-solid-state lithium secondary battery obtained by the present invention is not particularly limited. For example, the battery can be used as an all-solid-state lithium secondary battery for an automobile.

8. Shape

As an example of the all-solid-state lithium secondary battery obtained in the present invention, a coin type, a laminate type, a cylindrical type, and a square type can be cited. Among them, a coin type, a laminate type and a square type is preferable.

The present invention is not limited to the embodiments described above. The embodiments described above are mere illustrative, and those having substantially the same constitution and the same working effect as in the technical idea described in the claims of the present invention are included in the technical scope of the present invention.

EXAMPLES

Hereinafter, the present invention is explained in more detail by reference to the Examples.

Example 1

Production of an All-Solid-State Lithium Secondary Battery

A cathode active material ($LiCoO_2$) and a solid electrolyte material ($LiGe_{0.25}P_{0.75}S_4$) were mixed by a mass ratio of 7:3 and a cathode mix was prepared. This cathode mix of 15 mg and the solid electrolyte material of 200 mg, and an indium foil of 60 mg (thickness 0.2 mm) as an anode were placed in a molding holder and pressed by 5 t/cm$^2$ to produce an electrode pellet having a diameter of about 10 mm and a thickness of about 1.5 mm.

Next, an aqueous solution of cupric nitrate was dropped onto the end part of the inner side of an upper cover for a battery case of coin case type (made of SUS) and dried to precipitate cupric nitrate (metal salt) of about 0.5 g. Further, as the Example was supposed to create a submersion of the battery case at the time of case breakage, a hole of Φ1 mm was made to the upper cover of the coin case.

The above-mentioned electrode pellet was placed inside of the coin case and the coin case was sealed by a resin (PP (polypropylene)) to produce a coin cell.

Example 2

Production of an All-Solid-State Lithium Secondary Battery

A cathode active material ($LiCoO_2$) and a solid electrolyte material ($LiGe_{0.25}P_{0.75}S_4$) were mixed by a mass ratio of 7:3 and a cathode mix was prepared. This cathode mix of 15 mg and the solid electrolyte material of 200 mg, and an indium foil of 60 mg (thickness 0.2 mm) as an anode were placed in a molding holder and pressed by 5 t/cm² to produce an electrode pellet having a diameter of about 10 mm and a thickness of about 1.5 mm.

Next, an aqueous solution of cupric nitrate was dropped onto an upper cover for a battery case of laminate case type (made of aluminum) provided with a current collector made of SUS and a part of the inside of a lower cover thereof where no current collector is provided, that is the part where no potential is applied, and dried to precipitate cupric nitrate (metal salt) of about 0.5 g. Further, as the Example was supposed to create a submersion of the battery case at the time of case breakage, a hole of Φ1 mm was made to the upper cover of the laminate case.

After the above-mentioned electrode pellet was placed inside of the laminate case, the laminate case was sealed so as the current collector was derived to outside of the battery case. Thereby, a laminate cell was produced.

Example 3

A laminate cell was produced in the same manner as in the Example 2 except that a solid electrolyte material was changed to 70$Li_2S$-30$P_2S_5$ (obtained by following to the method disclosed in JP-A No. 2005-228570, wherein $Li_2$ and $P_2S_5$ were vitrified by a planetary ball mill with a mole ratio of $Li_2S$:$P_2S_5$=70:30 and then by heat treated) and an amount of cupric nitrate precipitated was made to 1.0 g.

Example 4

A laminate cell was produced in the same manner as in the Example 3 except that the metal salt used in the Example 3 was changed into lead nitrate and its amount precipitated was 1.5 g.

Comparative Example 1

A coin cell is produced in the same manner as in the Example 1 except that the metal salt used in the Example 1 was not used.

Comparative Example 2

A laminate cell is produced in the same manner as in the Example 3 except that the metal salt used in the Example 3 was not used.

[Evaluation]
(Hydrogen Sulfide Level Measurement)

The respective all-solid-state lithium secondary battery cells obtained in the Examples 1-4 and the Comparative Examples 1-2 were submersed into water of 30 ml in a 100 ml beaker placed inside of sealed plastic bag. The respective hydrogen sulfide level in the plastic bag after one minute from the submersion was subsequently measured with a hydrogen sulfide gas sensor (GBL-HS® manufactured by JIKCO Ltd.) set in the plastic bag. Measured results of the hydrogen sulfide level are shown in Table 1.

TABLE 1

| Hydrogen Sulfide Level | |
|---|---|
| | Hydrogen Sulfide Level ppm |
| Example 1 | 0 |
| Example 2 | 0 |
| Example 3 | 0 |
| Example 4 | 0 |
| Comparative Example 1 | 7 |
| Comparative Example 2 | 16 |

As shown in Table 1, the respective hydrogen sulfide levels obtained in Examples 1-4 were 0 ppm. On the other hand, hydrogen sulfide of 7 ppm and that of 16 ppm were detected in the Comparative Examples 1 and 2, respectively. The reason of this is assumed to be as follows. As no metal salt was presented in the respective cases when submersed, sulfide ions generated by a reaction between the sulfide-based solid electrolyte materials and water were unable to fix themselves so that hydrogen sulfide gas was generated in each cases.

In view of the above-mentioned results, it was ascertained that, in the respective all-solid-state lithium secondary batteries obtained in the Examples, by comprising the metal salt in the battery case, the metal cation of the metal salt generated by dissociation caused with water reacted with the sulfide ion generated by a reaction between the sulfide-based solid electrolyte material and the water, the precipitate is generated, and thereby the sulfide ion is fixed as the metal sulfide. It was ascertained thereby that the all-solid-state lithium secondary battery of the present invention has an effect of restricting generation of hydrogen sulfide gas.

The invention claimed is:

1. An all-solid-state lithium secondary battery using a sulfide-based solid electrolyte material,
   wherein the battery has a metal salt M-X comprising a metal element "M" and an anionic part "X" in a battery case thereof, and further
   wherein a metal cation of the metal salt M-X generated by disassociation caused with water can react with a sulfide ion generated by a reaction between the sulfide-based solid electrolyte material and the water, and further
   wherein the metal salt is provided in a place inside the battery case where no potential is applied, and further
   wherein the metal element "M" of the metal salt M-X is at least one selected from the group consisting of Cd, Sn, Pb, Cu, Hg, Ag, Mn, Zn, Fe and Ni, and further
   wherein the anionic part "X" of the metal salt M-X is at least one selected from the group consisting of OH, SO, and $NO_3$.

* * * * *